United States Patent [19]

Wiley

[11] Patent Number: 4,551,198
[45] Date of Patent: Nov. 5, 1985

[54] METHOD OF FLASHING BLACK LIQUOR

[75] Inventor: William E. Wiley, Glens Falls, N.Y.

[73] Assignee: Kamyr, Inc., Glens Falls, N.Y.

[21] Appl. No.: 592,062

[22] Filed: Mar. 22, 1984

Related U.S. Application Data

[62] Division of Ser. No. 363,522, Mar. 30, 1982.

[51] Int. Cl.⁴ .............................................. B01D 1/16
[52] U.S. Cl. .................... 159/47.3; 159/2.1; 159/DIG. 4; 159/DIG. 22; 159/48.2; 162/29
[58] Field of Search ....... 159/47.3, DIG. 4, DIG. 22, 159/DIG. 42, 2.1, 48.2, 47.1; 162/29

[56] References Cited

U.S. PATENT DOCUMENTS

| | | | |
|---|---|---|---|
| 1,438,502 | 12/1922 | Peebles | 159/2.1 |
| 2,044,095 | 6/1936 | Moore | 159/47.3 |
| 3,057,786 | 10/1962 | Waddill | 159/DIG. 4 |
| 3,073,380 | 1/1963 | Palmason | 159/DIG. 4 |
| 3,362,868 | 1/1968 | Backlund | 162/30.1 |
| 3,414,038 | 12/1968 | Laakso | 159/17 R |

OTHER PUBLICATIONS

Chemical Processing, "Evaporative Recovery System Slashes Fuel Costs"; Tucker et al.; Jun. 1983, pp. 94–97.

Primary Examiner—William F. Smith
Assistant Examiner—Andrew J. Anderson
Attorney, Agent, or Firm—Cushman, Darby & Cushman

[57] ABSTRACT

A flash tank, and method of flashing steam utilizing the tank, result in minimum foam generation so that the outlet steam remains uncontaminated. Feed fluid fed into the interior of the tank is positively prevented from splashing into the liquid seal provided adjacent the liquid outlet from the tank. This may be done by directing the feed fluid upwardly when introduced into the tank, and providing a liquid holding tank externally of the flash tank, feed fluid impacting upon a deflecting member and then the conically downwardly tapering walls of a bottom portion of the tank. Another alternative is to feed the feed fluid downwardly into the tank to impact upon a conical deflecting member so that there is minimum loss of momentum of the feed fluid, and again it impacts upon the conically tapering walls of the tank bottom portion.

9 Claims, 6 Drawing Figures

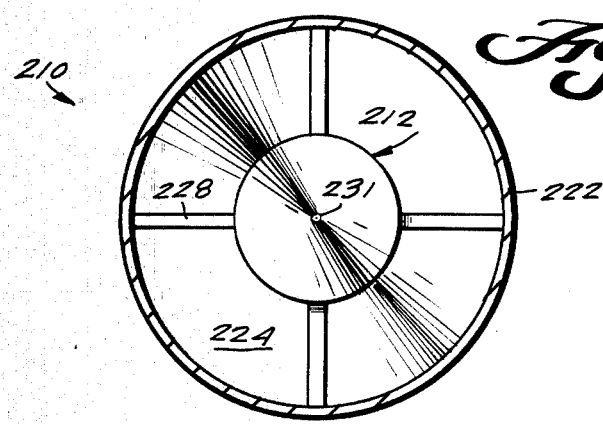
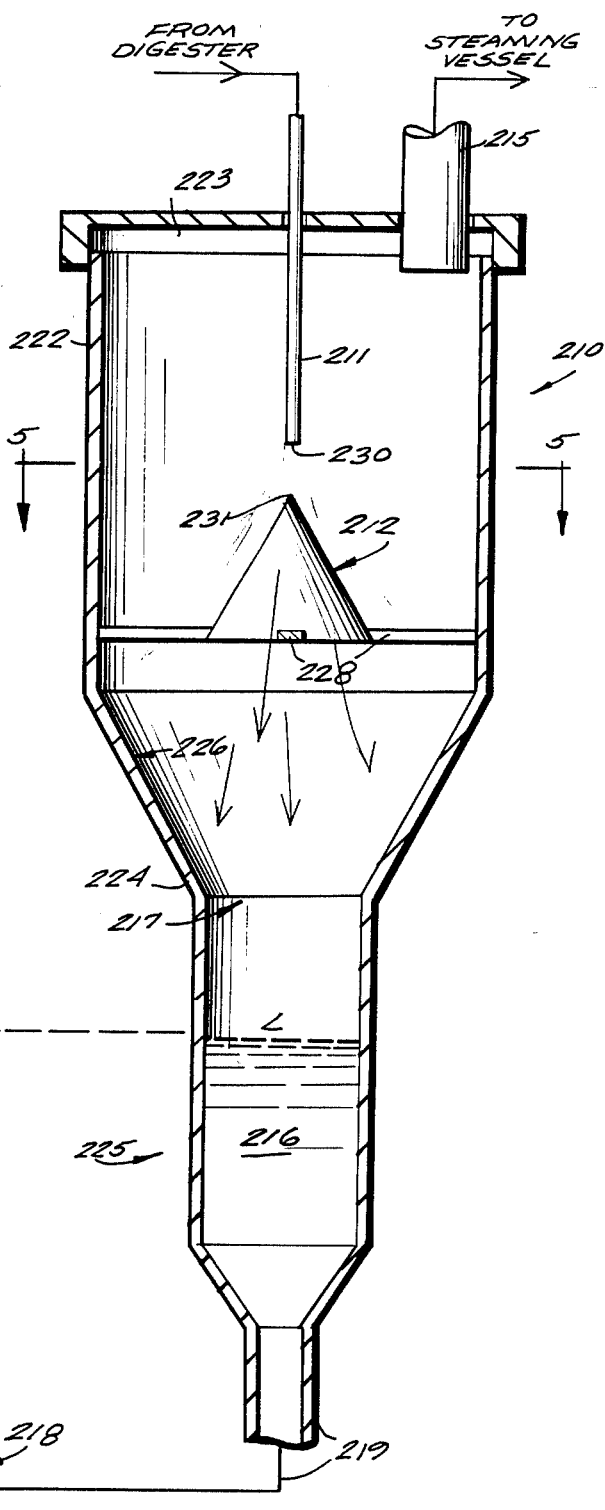

METHOD OF FLASHING BLACK LIQUOR

This is a division of application Ser. No. 363,522 filed Mar. 30, 1982.

BACKGROUND AND SUMMARY OF THE INVENTION

Flash tanks are common pieces of equipment utilized in many chemical and industrial processes. The flash tank is typically used to recover steam from a process fluid, to utilize the steam in other portions of the process, and also allow recycle or other disposition of process liquid with which the steam may be mixed. One typical industrial process utilizing one or more flash tanks is the digestion of comminuted cellulosic fibrous material to form paper pulp or the like. Typical utilization of flash tanks for such a process may be seen in U.S. Pat. Nos. 3,362,868 and 3,414,038.

Conventional flash tanks usually have far from ideal operation. Foam is generated within the flash tank, and if the foam generation is too great, the foam can be carried out of the flash tank with the flashed steam. Foam in the flashed steam makes that steam unsuitable for further utilization in the process system (e.g. unsuitable for use in steaming wood chips to be supplied to a continuous pulp digester). It has always been thought that foam was inherently formed when the feed liquor was introduced into the flash tank, and the most common attempt to prevent foam being carried from the flash tank was to provide a spiral arrangement, referred to as a cyclone separator, at the top of the flash tank. However under many circumstances foam generation is still undesirably high, often resulting in substantial down time of the chemical or industrial process (e.g. shut down of the continuous pulp digester).

According to the present invention it has now been recognized that the source of the foaming problem in flash tanks is the splashing of feed fluid in the liquid seal maintained within the flash tank. The maintenance of a liquid seal at the liquid outlet from the flash tank is necessary in order to prevent steam from being carried with liquid from the flash tank to a subsequent processing station (e.g. another flash tank, chemical recovery, or the like). To the extent that the splashing action can be minimized the density of any foam generated can be increased, and the higher the density of the foam the less likelihood there is that any of it will be carried out with the steam through the steam vent. Also, according to the present invention it has been found that other mechanisms can be utilized for enhancing the density of the generated foam, further minimizing the possibility that foam will be carried out the steam vent.

According to one aspect of the present invention a method of flashing steam in a vertically disposed flash tank, having a feed fluid inlet, a steam outlet, and a liquid outlet, is provided. The method comprises the following steps:

(a) Continuously feeding feed fluid under pressure into the inlet. Typical feed fluid might be the black liquor from a continuous pulp digester.

(b) In the flash tank, reducing the pressure acting on the feed fluid so that steam and liquid are generated.

(c) Removing the generated steam through the steam outlet. The steam is subsequently re-utilized in the chemical or industrial process, such as by passing it to a steaming vessel for steaming wood chips ultimately to be fed to the pulp digester.

(d) Removing the liquid through the liquid outlet. The removed liquid may, for example, in a cellulosic pulping process be passed to a second flash tank, and ultimately to a black liquor storage or regeneration station.

(e) Maintaining a liquid seal adjacent the liquid outlet so that no steam passes through the liquid outlet with the liquid. If steam passes with the liquid to the next station it greatly adversely affects the next station, and may require shut down of the entire process. And, (f) positively preventing feed fluid from directly impacting liquid in the liquid seal so that foam generated by feed fluid splashing in the liquid is minimized, and so that foam will not pass out of the steam outlet. Foam passing out the steam outlet renders the steam sought to be recovered unusable for its desired functions.

The flash tank according to the present invention is utilizable in practicing the abovedescribed method, and may be constructed in two primary manners. The feed fluid may be introduced downwardly through the top of the vessel to impact upon a conical deflecting member, and from the conical deflecting member be deflected onto the conically downwardly sloping walls of a bottom portion of the flash tank. Another way is to provide a liquid holding tank externally of the flash tank, the liquid seal being provided in the liquid holding tank. The feed fluid is introduced upwardly in the tank, impacts upon a shallow dish deflecting plate, and from the deflecting plate is deflected onto the conically downwardly sloping walls of the flash tank bottom portion. The liquid holding tank preferably extends directly downwardly from the flash tank liquid outlet, and the cross-sectional dimensions thereof are provided so that the normal impacting pattern of the deflected feed fluid is onto the flash tank walls, not in the liquid seal. The external liquid holding tank arrangement can also be provided with the downwardly directed feed fluid conduit with conical deflecting member.

It is the primary object of the present invention to provide a flash tank, and method of flashing steam utilizing such a tank, with minimum possibilities that foam from the tank will contaminate the flashed steam. This and other objects of the invention will become clear from an inspection of the detailed description of the invention and from the appended claims.

BRIEF DESCRIPTION OF THE DRAWINGS

FIG. 5 is a horizontal cross-sectional view taken along lines 5—5 of the flash tanks of FIGS. 4 and 6; and FIG. 6 is a vertical cross-sectional view of another exemplary flash tank according to the invention.

DETAILED DESCRIPTION OF THE DRAWINGS

The Prior Art Flash Tank Construction

Figure 1:
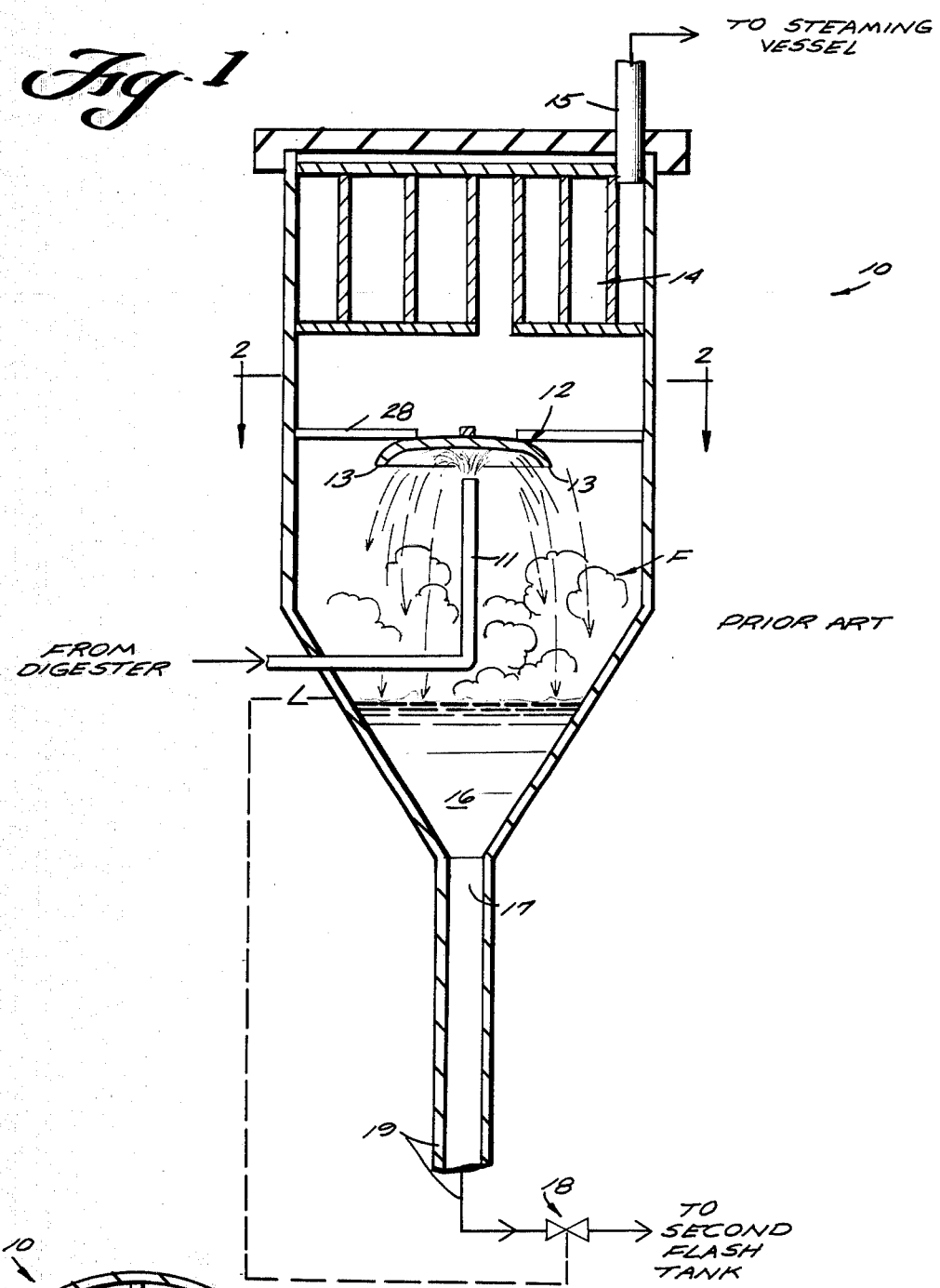
FIG. 1 is a vertical cross-sectional view of a typical prior art flash tank.
Figure 2:
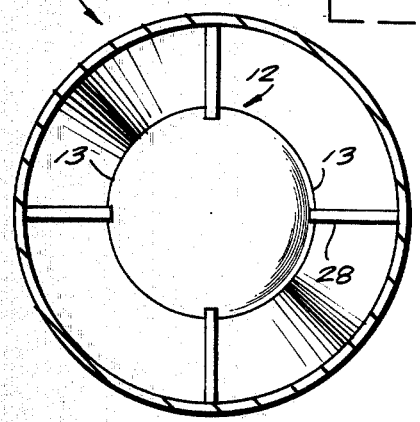
FIG. 2 is a horizontal cross-sectional view, taken at lines 2—2 of FIG. 1, of the typical conventional flash tank of FIG. 1.

An exemplary prior art flash tank is illustrated generally by reference numeral 10 in FIGS. 1 and 2. The flash tank 10 is typical of the first flash tank in a cellulosic pulping process, such as shown in U.S. Pat. No. 3,414,038 (the disclosure of which is hereby incorporated by reference herein) wherein black liquor from a continuous digester is fed through feed fluid inlet conduit 11 into the interior volume of the tank 10. Feed fluid from the conduit 11 is directed upwardly to impact upon an "elliptical" deflecting member 12, with downwardly formed ends 13. A portion of the feed fluid flashes into steam which passes through a spiral track arrangement, shown generally by reference numeral 14 (sometimes called a cyclone separator) and out a steam outlet 15, ultimately to be passed to a steaming vessel in the pulping system. The liquid from the feed fluid—after being deflected by member 12—passes downwardly in the tank 10.

At the bottom of the tank 10 a liquid seal, shown generally by reference numeral 16, is provided. The liquid seal 16 provides a volume of liquid within the tank 10 above the liquid outlet 17, the liquid seal being necessary to prevent the flashed steam from exiting through the liquid outlet 17 (referred to as "blow through"). A valve 18 in the liquid conduit 19 from the liquid outlet 17 is controlled to maintain the liquid level L and provide the liquid seal 16 within the tank 10.

In the utilization of the flash tank 10, foam is always generated, the foam being indicated by reference letter F in FIG. 1. Under some operating conditions there is an excessive amount of foam F generated, and the foam will then be carried with steam through the steam outlet 15, rendering the steam unusable for its desired purposes. After the foam F reaches a certain height within the vessel 10, the foam generation is accelerated, and quickly an uncontrolled overfoaming condition is reached.

According to the present invention, the source of the foam-generating problem inherent in the flash tank 10 of the prior art has been determined. It has been determined that the liquid fraction of the feed fluid after being deflected by the "elliptical" deflecting member 12 splashes into the volume of liquid defining the liquid seal 16, and that such splashing action generates the majority of the foam F. It has also been found according to the present invention that the more dense the foam F the more of the head there will be provided for effecting passage of liquid out the liquid outlet 17, and the less likelihood there will be that an overfoaming condition can occur.

The Preferred Embodiments Of The Invention

Figure 3:
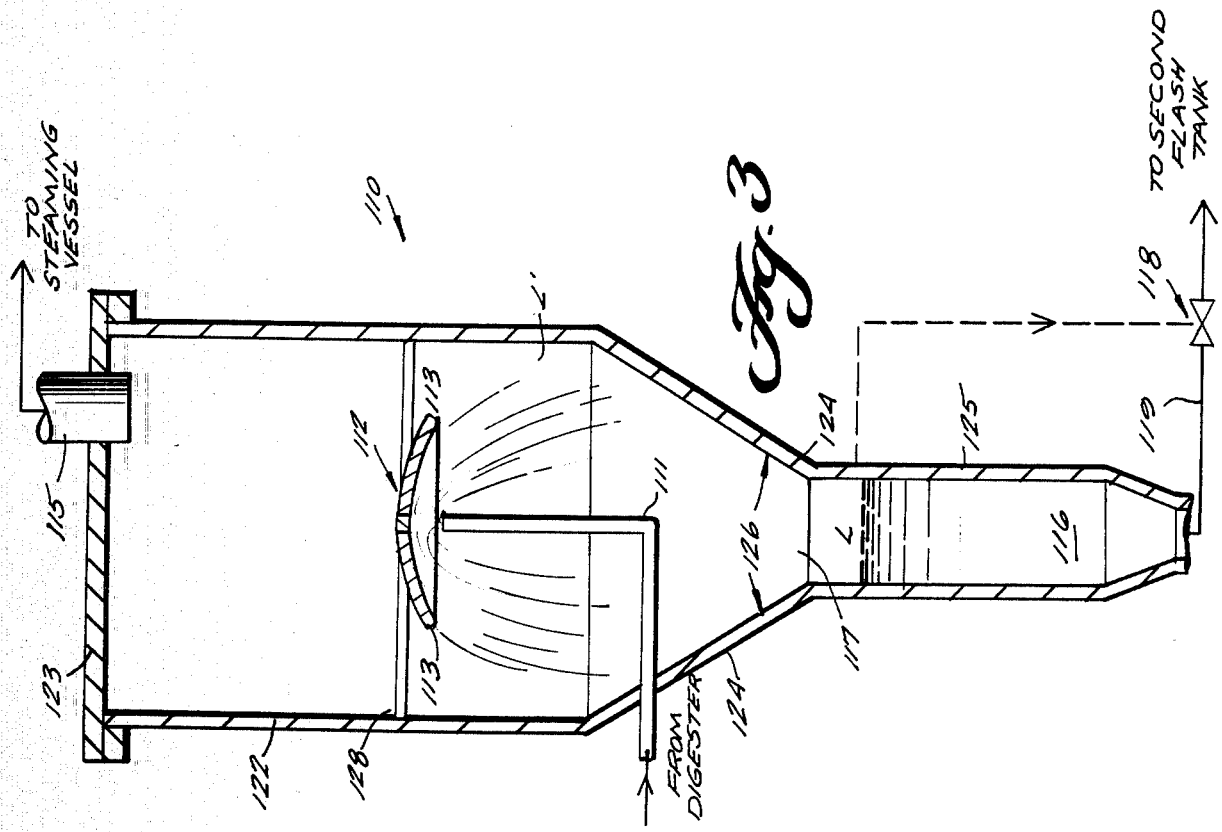
FIG. 3 is a vertical cross-sectional view of an exemplary flash tank according to the present invention.

One exemplary construction of a flash tank according to the present invention that overcomes the problems of the prior art flash tank 10 is illustrated in FIG. 3. Components of the inventive flash tank corresponding to components of the prior art flash tank 10 are indicated by the same reference numeral only preceded by the numeral "1".

The body of the flash tank 110 has the same basic construction as the prior art, including vertically extending side walls 122 (preferably a continuous side wall 122, the structure being circular in cross-section), a top 123, and a bottom portion comprising conically downwardly tapering walls 124. The liquid outlet 117 is provided at the bottom of the conically downwardly tapering walls 124. The flash tank 110 differs from the prior art flash tank 10 in the provision of the liquid seal 116 externally of the interior volume of the tank (i.e. externally of the liquid outlet 117). In the actual embodiment illustrated in FIG. 3, a liquid holding tank 125, concentric with the flash tank 110, extends downwardly from the liquid outlet 117, and the liquid level L is maintained therein by control of the valve 118. The dimensions of the liquid outlet 117 and the cross-sectional area of the liquid holding tank 110 are chosen so that the liquid fraction L of the feed fluid when deflected by the deflecting member 112 in the normal manner will impact directly upon the downwardly sloping side walls 124 of the bottom portion of the flash tank 110, and not in the liquid seal 116 volume. After impacting generally at areas 126 around the entire circumference of the conical downwardly sloping walls 124, the liquid flows relatively gently downwardly into the liquid seal 116 without undue splashing, thereby the generation of foam is minimized.

Note that the deflecting member 112 of the flash tank 110 also may differ from the construction of the prior art deflecting member 12. Although an "elliptical" deflecting member like the member 12 can be used in the flash tank 110, it has been found that best results are achieved utilizing a shallow dish member 112 as the deflecting member, and the shallow dish may be either circular or elliptical in plan view, and is mounted to the side walls 122 by spider arms 128 or the like. The bottom ends 113 thereof do not direct the liquid straight downwardly as the ends 13 tend to do.

Typical dimensions of the components of the flash tank 110 for a typical commercial cellulosic pulp process are as follows: The internal diameter of the conduit 119 (the same as the diameter of the conduit 19 of the prior art flash tank 10) is 18 inches. The interior diameter of the liquid holding tank 125 (and the diameter of the liquid outlet 117) is about 3–4 feet. The length of the liquid holding tank 125 is about 10 to 12 feet.

It is also noted that the flash tank 110 differs from the prior art flash tank 10 in that no cyclone separator 14 is necessary, the interior volume above deflector 112 being open. This allows the overall vertical dimension of the tank 110 to be reduced, if desired, and provides a less expensive and more simplified structure.

According to the present invention it has also been recognized that the denser the foam in the flash tank the more capacity the flash tank will have, and that a high flash fluid velocity generates a denser foam. The density increase with increasing velocity is the result of increased momentum of the flash fluid, and with the increased momentum the liquid fraction of the flash fluid is capable of rupturing more foam bubbles, thus densifying the foam before its momentum is lost. These factors have been taken into account (as well as the need to prevent the liquid fraction of the feed fluid from splashing in the liquid seal) in the construction of the flash tanks of FIGS. 4 through 6. Reference numeral identifying structures in FIGS. 4 through 6 corresponding to structures in the FIG. 3 embodiment are the same as the reference numerals in the FIG. 3 embodiment only having a "2" as the first numeral thereof rather than a "1". Reference numerals utilized for similar structures in both the FIGS. 4 and 6 modifications are the same.

In the flash tank 210, the feed fluid conduit 211 is disposed centrally of the side walls 222 and is directed vertically downwardly. The termination 230 of the conduit 211 is just above the tip 231 of conical deflecting member 212. With such an arrangement, the feed fluid will have the maximum momentum within the interior volume of the flash tank 210, and when it impinges upon the tip 231 of the deflecting cone 212 it will be redirected at a relatively small angle (e.g. about 30° as opposed to 180° in the FIG. 3 embodiment, and the prior art). It impinges upon the conical downwardly sloping walls 224 of the bottom portion of the tank 210, and then will flow relatively gently down the walls to the liquid seal volume 216, so that no splashing occurs. Also, as illustrated in FIG. 4, should enough foam F be generated so that the foam level is adjacent the impact area 226, because of the high momentum of the deflected feed fluid it will break the foam bubbles, and thereby densify the foam, leading to the advantageous results previously discussed.

Figure 4:
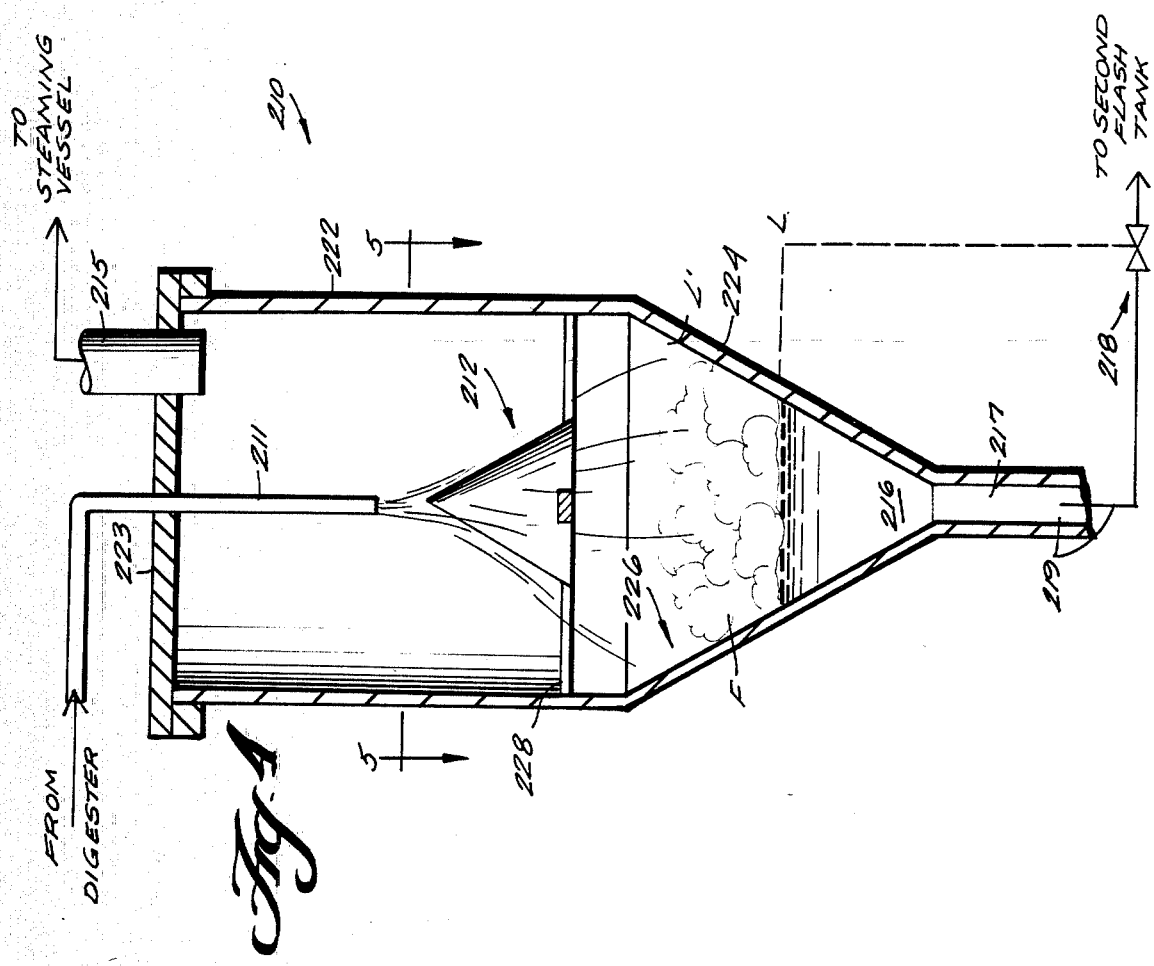
FIG. 4 is a vertical cross-sectional view of another exemplary flash tank according to the present invention.

The only difference between the FIG. 4 embodiment and the FIG. 6 embodiment is the provision of a liquid holding tank 225 in the FIG. 6 embodiment.

The FIG. 6 embodiment provides maximum advantageous results. The FIGS. 4 and 6 embodiments are preferred for new installations, and the FIG. 3 embodiment is preferred for retrofitting existing flash tanks.

While the flash tanks 110, 210 according to the present invention have been described—and are ideally utilized—in association with a continuous pulp digester, a subsequent second flash tank, and a steaming vessel, the basic features thereof may be utilized in a wide variety of chemical and industrial processes.

Operation

Operation of the flash tanks 110, 210 according to the present invention will now be described with particular reference to FIGS. 3 and 4.

A feed fluid, such as black liquor from a continuous digester, is fed under pressure through the inlet conduits 111, 211 to the flash tanks 110, 210. In the flash tank 110, 210 the pressure acting on the feed fluid is reduced so that steam flashes, and the liquid portion of the feed fluid flows downwardly. The flashed steam is removed through the steam outlet 115, 215, and the liquid is removed through the liquid outlet 117, 217. A liquid seal 116, 216 is maintained adjacent the liquid outlet 117, 217 so that no steam "blows through" the flash tank 110, 210 to the next process station (e.g. a second flash tank).

Feed fluid is positively prevented from directly impacting liquid in the liquid seal 116, 216 so that foam generated by feed fluid splashing in the liquid is minimized, and so that foam will not pass out the steam outlet 115, 215. In the FIG. 3 embodiment positive prevention of the splashing is accomplished by providing the liquid holding tank 125, which defines the liquid seal, mounted externally of the flash tank 110 (i.e. external of the liquid outlet 117), and its cross-sectional area (and the area of the outlet 117) are dimensioned so that liquid L' being redirected by the deflecting member 112 will impact at areas 126 on the walls 124 of the flash tank 110, and flows relatively gently down the walls 124 to the liquid seal 116.

In the FIG. 4 embodiment, splashing is positively prevented by directing the feed fluid inlet 211 downwardly and by providing the conically shaped deflecting member 212 upon which the feed fluid impacts, loss of momentum of the liquid fraction L' of the feed fluid being minimized, the liquid L' impacting at area 226 of the conical walls 224, and the liquid cutting any foam bubbles of the foam F that may be adjacent the impact area 226.

It will thus be seen that according to the present invention an effective flash tank, and method of flashing steam in a flash tank, have been provided, overcoming problems inherent in the prior art. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods, structures, and assemblies.

What is claimed is:

1. A method of flashing steam in a vertically disposed flash tank having a black liquor from a pulping process inlet at a central portion of the flash tank, a steam outlet, and a liquid outlet, and sidewalls, comprising the steps of:
    (a) continuously feeding black liquor from a pulping process under pressure downwardly into the flash tank through the centrally located inlet;
    (b) in the flash tank, reducing the pressure acting on the downwardly directed black liquor so that steam and liquid are generated thereby;
    (c) removing the generated steam through the steam outlet;
    (d) removing the liquid through the liquid outlet;
    (e) maintaining a seal adjacent the liquid outlet so that steam passes through the liquid outlet with the liquid; and
    (f) deflecting the downwardly directed central feed of black liquor interiorly of the flash tank so that it hits the sidewalls of the tank and has minimum momentum loss due to deflecting action so that the density of foam formed in the flash tank is maximized.

2. A method as recited in claim 1 wherein the steam removed from the steam outlet in step (c) is passed to a steaming vessel in a pulping process.

3. A method as recited in claim 2 wherein the liquid removed through the liquid outlet in step (d) is passed directly to a second vertically disposed flash tank.

4. A method as recited in claim 3 wherein step (e) is practiced by maintaining a liquid seal exteriorly of the flash tank.

5. A method as recited in claim 4 further utilizing a conical deflecting member having the tip portion thereof pointing upwardly and stationarily mounted within the tank, and wherein steps (a) and (f) are further practiced by downwardly directing the black liquor so that it impinges upon the tip portion of the conical deflecting member and is deflected thereby.

6. A method as recited in claim 1 wherein the liquid removed through the liquid outlet in step (d) is passed directly to a second vertically disposed flash tank.

7. A method as recited in claim 1 wherein step (e) is practiced by maintaining a liquid seal exteriorly of the flash tank.

8. A method as recited in claim 1 further utilizing a conical deflecting member having the tip portion thereof pointing upwardly and stationarily mounted within the tank, and wherein steps (a) and (f) are further practiced by downwardly directing the black liquor so that it impinges upon the tip portion of the conical deflecting member and is deflected thereby.

9. A method as recited in claim 8 wherein step (e) is practiced by maintaining a liquid seal exteriorly of the flash tank.

* * * * *